US012671034B2

(12) United States Patent
Lee et al.

(10) Patent No.: US 12,671,034 B2
(45) Date of Patent: Jun. 30, 2026

(54) MULTILAYER CERAMIC CAPACITOR AND METHOD OF FABRICATING THE SAME

(71) Applicant: SAMSUNG ELECTRO-MECHANICS CO., LTD., Suwon-si (KR)

(72) Inventors: Seung Yong Lee, Suwon-si (KR); Yonghwa Lee, Suwon-si (KR); Minsoo Kim, Suwon-si (KR); Sang Jin Park, Suwon-si (KR); Choongseop Jeon, Suwon-si (KR); Jinbok Shin, Suwon-si (KR); Daejin Shim, Suwon-si (KR); Hyunsik Chae, Suwon-si (KR); Hyo-Jin Kim, Suwon-si (KR); Junghyun An, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 94 days.

(21) Appl. No.: 18/586,974

(22) Filed: Feb. 26, 2024

(65) Prior Publication Data
US 2025/0140482 A1     May 1, 2025

(30) Foreign Application Priority Data

Oct. 27, 2023    (KR) ........................ 10-2023-0145383

(51) Int. Cl.
*H01G 4/30*        (2006.01)
*C04B 35/468*      (2006.01)
(Continued)

(52) U.S. Cl.
CPC ............. *H01G 4/30* (2013.01); *C04B 35/468* (2013.01); *H01G 4/008* (2013.01); *H01G 4/012* (2013.01); *H01G 4/1227* (2013.01); *H01G 4/224* (2013.01)

(58) Field of Classification Search
CPC .......... H01G 4/30; H01G 4/008; H01G 4/012; H01G 4/1227; H01G 4/224; C04B 35/468
See application file for complete search history.

(56) References Cited

U.S. PATENT DOCUMENTS

| | | | | |
|---|---|---|---|---|
| 7,795,663 B2 * | 9/2010 | Suh | ................... | H01L 21/02337 |
| | | | | 438/785 |
| 9,633,788 B2 * | 4/2017 | Fukunaga | ............ | H01G 4/1227 |

(Continued)

FOREIGN PATENT DOCUMENTS

| | | |
|---|---|---|
| JP | 2019-106528 A | 6/2019 |
| KR | 10-1699388 B1 | 1/2017 |
| KR | 10-2055610 B1 | 12/2019 |

*Primary Examiner* — Timothy J. Dole
(74) *Attorney, Agent, or Firm* — Morgan, Lewis & Bockius LLP

(57)              ABSTRACT
A multilayer ceramic capacitor includes: a capacitor body comprising a dielectric layer and an internal electrode layer; and an external electrode disposed on an outside surface of the capacitor body, wherein the capacitor body includes an active portion where the dielectric layer and the internal electrode layer are alternately disposed, side margin portions disposed at both side end portions of the active portion facing each other, and bonding portions disposed between the active portion and the side margin portions, and at least one of the active portion or the side margin portions includes a barium titanate-based main ingredient including barium (Ba) and titanium (Ti), and gallium (Ga).

12 Claims, 12 Drawing Sheets

(51) Int. Cl.

| | |
|---|---|
| *H01G 4/008* | (2006.01) |
| *H01G 4/012* | (2006.01) |
| *H01G 4/12* | (2006.01) |
| *H01G 4/224* | (2006.01) |

(56)         References Cited

U.S. PATENT DOCUMENTS

| | | | |
|---|---|---|---|
| 10,896,781 B2 * | 1/2021 | Park ..................... | H01G 4/0085 |
| 10,937,595 B2 * | 3/2021 | Park ......................... | H01G 4/12 |
| 11,587,732 B2 * | 2/2023 | Park ..................... | H01G 4/1227 |
| 2015/0340155 A1 | 11/2015 | Fukunaga et al. | |
| 2017/0169952 A1 | 6/2017 | Kato et al. | |
| 2022/0028612 A1 * | 1/2022 | Park ..................... | H01G 4/1227 |
| 2022/0199326 A1 * | 6/2022 | Kim .................. | C04B 35/62821 |
| 2024/0331944 A1 * | 10/2024 | Takita ................... | H01G 4/012 |
| 2024/0379292 A1 * | 11/2024 | Chae ..................... | H01G 4/232 |
| 2025/0140482 A1 * | 5/2025 | Lee ..................... | C04B 35/4682 |

* cited by examiner

Laminating → Pressing/Cutting → Bonding margin sheet → Forming side margin portion Site 1

| Element | Line Type | k Ratio | Wt% |
|---|---|---|---|
| Si | K series | 0.00196 | 0.50 |
| Ga | K series | 0.00000 | 0.00 |
| Ba | L series | 0.76772 | 80.01 |
| Total: | | | 80.51 |

Site 2

| Element | Line Type | k Ratio | Wt% |
|---|---|---|---|
| Si | K series | 0.00267 | 0.68 |
| Ga | K series | 0.00539 | 0.51 |
| Ba | L series | 0.78451 | 81.90 |
| Total: | | | 83.08 |

Site 3

| Element | Line Type | k Ratio | Wt% |
|---|---|---|---|
| Si | K series | 0.00297 | 0.76 |
| Ga | K series | 0.00904 | 0.85 |
| Ba | L series | 1.22963 | 128.25 |
| Total: | | | 129.85 |

Site 4

| Element | Line Type | k Ratio | Wt% |
|---|---|---|---|
| Si | K series | 0.00291 | 0.74 |
| Ga | K series | 0.00612 | 0.57 |
| Ba | L series | 1.54232 | 160.70 |
| Total: | | | 162.02 |

Site 1

| Element | Line Type | k Ratio | Wt% |
|---|---|---|---|
| Si | K series | 0.00230 | 0.58 |
| Ga | K series | 0.00000 | 0.00 |
| Ba | L series | 0.74415 | 77.59 |
| Total: | | | 78.18 |

Site 2

| Element | Line Type | k Ratio | Wt% |
|---|---|---|---|
| Si | K series | 0.00197 | 0.50 |
| Ga | K series | 0.00566 | 0.53 |
| Ba | L series | 0.74987 | 78.23 |
| Total: | | | 79.26 |

Site 3

| Element | Line Type | k Ratio | Wt% |
|---|---|---|---|
| Si | K series | 0.00306 | 0.78 |
| Ga | K series | 0.01167 | 1.10 |
| Ba | L series | 1.26623 | 132.10 |
| Total: | | | 133.97 |

Site 4

| Element | Line Type | k Ratio | Wt% |
|---|---|---|---|
| Si | K series | 0.00305 | 0.78 |
| Ga | K series | 0.00724 | 0.68 |
| Ba | L series | 1.52680 | 159.12 |
| Total: | | | 160.57 |

MULTILAYER CERAMIC CAPACITOR AND METHOD OF FABRICATING THE SAME

CROSS-REFERENCE TO RELATED APPLICATION

This application claims priority to and the benefit of Korean Patent Application No. 10-2023-0145383 filed at the Korean Intellectual Property Office on Oct. 27, 2023, the entire contents of which are incorporated herein by reference.

BACKGROUND

The present disclosure relates to a multilayer ceramic capacitor and a method of fabricating the same.

An electronic component that uses a ceramic material includes a capacitor, an inductor, a piezoelectric element, a varistor, a thermistor, or the like. A multilayer ceramic capacitor (MLCC) among the ceramic electronic component may be used in various electronic devices due to its advantages of being small, high-capacity, and easy to mount.

For example, the multilayer ceramic capacitor (MLCC) may be installed at substrates of various electronic products such as an imaging device such as a liquid crystal display device (LCD), a plasma display device panel (PDP), an organic light emitting diode (OLED), or the like, a computer, a personal portable terminal, and a smartphone so that the multilayer ceramic capacitor (MLCC) is used as a chip-type condenser that plays a role in charging or discharging electricity therein or therefrom.

On the other hand, the multilayer ceramic capacitors (MLCC) form an internal structure in which a dielectric layer including $BaTiO_3$ and an Ni internal electrode layer are alternately stacked, and an external structure of the multilayer ceramic capacitors (MLCC) includes a $BaTiO_3$ layer with an excellent density of a certain thickness to protect a chip from various external stimuli. The external structure has problems of occurrence of a crack due to external stress and degradation of an electrical characteristic due to a step difference occurs in a portion where there is no internal electrode layer.

SUMMARY

Some embodiments of the present disclosure provides a multilayer ceramic capacitor having excellent moisture resistance reliability and an excellent withstand voltage characteristic by improving a density at an end of an internal electrode layer.

Another embodiment provides a method of fabricating the multilayer ceramic capacitor.

A multilayer ceramic capacitor according to some embodiments includes: a capacitor body including a dielectric layer and an internal electrode layer; and an external electrode disposed on an outside surface of the capacitor body. The capacitor body includes an active portion where the dielectric layer and the internal electrode layer are alternately disposed, side margin portions disposed on both side end portions of the active portion facing each other, and bonding portions disposed between the active portion and the side margin portions, and at least one of the active portion or the side margin portions includes a barium titanate-based main ingredient including barium (Ba) and titanium (Ti), and gallium (Ga).

The barium titanate-based main ingredient and gallium (Ga) may be included in the side margin portion.

If each of the side margin portions are substantially equally divided into two in a width direction so that regions closer to the bonding portions are referred to as a first side margin portion and the remaining regions are referred to as a second side margin portion, gallium (Ga) may be included in the first side margin portion.

Gallium (Ga) may be included in an amount ranging from more than 0 parts by weight to 1.5 parts by weight or less based on 100 parts by weight of the barium (Ba) within the first side margin portion.

Gallium (Ga) may be included in the first side margin portion and the second side margin portion, and gallium (Ga) may be included in a higher content in the first side margin portion than in the second side margin portion.

The barium titanate-based main ingredient and gallium (Ga) may be included in the active portion.

The active portion may include boundary vicinity regions defined as a region from a boundary between the active portion and the bonding portions to a point having a length corresponding to two to three times a width direction length of each of the side margin portions, and gallium (Ga) may be included in the boundary vicinity region of the active portion.

If the boundary vicinity regions of the active portion are substantially equally divided into two in a width direction, and one of the regions closer to the bonding portions is referred to as a first active portion and the remaining region is referred to as a second active portion., Gallium (Ga) may be included in the first active portion and the second active portion, and an amount of gallium (Ga) may be higher in the first active portion than in the second active portion.

The barium titanate-based main ingredient and gallium (Ga) may be included in the side margin portion and the active portion.

Gallium (Ga) may be included in a higher content in the side margin portion than in the active portion.

The bonding portion may include a barium titanate-based compound including barium (Ba) and titanium (Ti), and gallium (Ga).

Gallium (Ga) may be included in an amount of 0.3 parts by weight to 1.5 parts by weight based on 100 parts by weight of the barium (Ba) within the bonding portion.

A pore generation rate at an end portion of the internal electrode layer obtained by Equation 1 below with respect to a bonding surface between the active portion and the bonding portion may be more than 0% to 40% or less.

$$\text{The pore generation rate at the end portion of the internal electrode layer (\%)} = \frac{\text{The number of internal electrode layers having pores at the end portion thereof}}{\text{Total number of the internal electrode layers}} \times 100. \quad \text{[Equation 1]}$$

A method of fabricating the multilayer ceramic capacitor according to some embodiments includes: preparing a margin sheet with an adhesive surface by applying a coating composition including a barium titanate-based compound and gallium (Ga) to at least one surface of the margin sheet; fabricating a dielectric green sheet using a dielectric slurry to form a conductive paste layer on a surface of the dielectric green sheet; fabricating a dielectric green sheet laminate by laminating the dielectric green sheet on which the conductive paste layer is formed; cutting the dielectric green sheet laminate in a state in which the conductive paste layer is exposed without leaving a region in which the conductive paste layer is not formed; bonding the margin sheet having the adhesive surface to a cut surface of the dielectric green sheet laminate; fabricating a capacitor body by firing the dielectric green sheet laminate to which the margin sheet is bonded; and forming an external electrode on one surface of the capacitor body. The capacitor body includes an active portion where a dielectric layer and an internal electrode layer are alternately disposed, side margin portions that are disposed at both side end portions of the active portion facing each other, and bonding portions disposed between the active portion and the side margin portions, and at least one of the active portion and the side margin portions includes a barium titanate-based main ingredient including barium (Ba) and titanium (Ti), and gallium (Ga).

The coating composition may include gallium (Ga) in an amount ranging from more than 0 parts by mole to 6 parts by mole or less based on 100 parts by mole of the barium titanate-based compound.

Gallium (Ga) may be included in an Ga-containing oxide, a Ga-containing nitride, a Ga-containing salt compound, or a combination thereof within the coating composition.

The coating composition may further include a binder.

The multilayer ceramic capacitor according to some embodiments may have excellent moisture resistance reliability and an excellent withstand voltage characteristic by improving a density of an end of an internal electrode layer.

BRIEF DESCRIPTION OF THE DRAWINGS

FIG. 4 is a schematic diagram showing a process of forming a side margin portion in a method of fabricating the multilayer ceramic capacitor according to an embodiment.

DETAILED DESCRIPTION OF THE EMBODIMENTS

Figure 1:
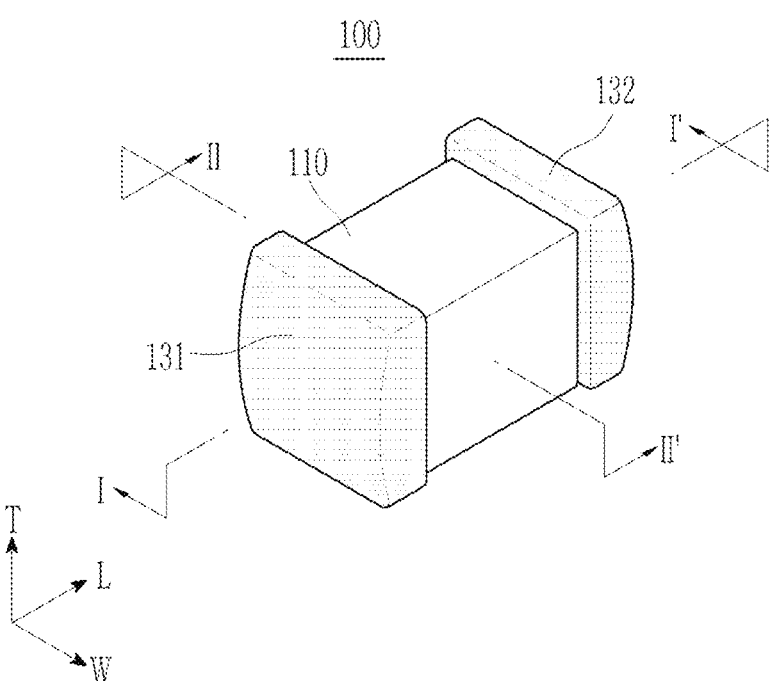
FIG. 1 is a perspective view showing a multilayer ceramic capacitor according to an embodiment.

The present disclosure will be described more fully hereinafter with reference to the accompanying drawings, in which embodiments of the disclosure are shown. In order to clearly describe the present disclosure, parts or portions that are irrelevant to the description are omitted, and identical or similar constituent elements throughout the specification are denoted by the same reference numerals. Additionally, in the accompanying drawings, some constituent elements are exaggerated, omitted, or schematically shown, and a size of each constituent element does not entirely reflect an actual size.

The accompanying drawings are provided only in order to allow embodiments disclosed in the present specification to be easily understood and are not to be interpreted as limiting the spirit disclosed in the present specification, and it is to be understood that the present disclosure includes all modifications, equivalents, and substitutions without departing from the scope and spirit of the present disclosure.

Terms including an ordinal number such as first, second, and the like may be used to describe various constituent elements, but the constituent elements are not limited by the terms. The terms are used only for the purpose of distinguishing one constituent element from another.

It will be understood that when an element such as a layer, film, region, area, or substrate is referred to as being "on" or "above" another element, it may be directly on the other element or intervening elements may also be present. In contrast, when an element is referred to as being "directly on" another element, there are no intervening elements present. Further, in the specification, the word "on" or "above" means disposed on or below the object portion, and does not necessarily mean disposed on the upper side of the object portion based on a gravitational direction.

In the present specification, terms such as "comprise" or "have" are intended to designate that a feature, number, step, operation, constituent element, part, or combination thereof described in the specification exists, and it should be understood as not precluding the possibility of the presence or addition of and one or more other features, numbers, steps, actions, constituent elements, parts, or combinations thereof. In addition, unless explicitly described to the contrary, the word "comprise" and variations such as "comprises" or "comprising" will be understood to imply the inclusion of stated elements but not the exclusion of any other elements.

Further, throughout the specification, the phrase "on a plane" means viewing a target portion from the top, and the phrase "on a cross-section" means viewing a cross-section formed by perpendicularly cutting a target portion from the side.

Throughout the specification, when it is described that a part is "connected" to another part, the part may be "directly connected" to the other element, may be "connected" to the other part through a third part, or may be connected to the other part physically or electrically, and may be referred to by different titles depending on positions or functions, but respective portions that are substantially integrated into one body may be connected to each other.

As used herein, the term "substantially" means a small, insignificant amount from absolute or perfect conditions, dimensions, measurements, results, etc., would be expected by one skilled in the art, but which does not significantly affect overall performance and allow for variation. "Substantially" when used for a number or parameter or property that can be expressed as a number means within 10 percent.

The term "about," as used herein, means approximately. In general, the term "about" is used herein to modify a numerical value above and below the stated value by a variance of 10%. In one aspect, the term "about" means plus or minus 20% of the numerical value of the number with which it is being used. Hereinafter, a multilayer ceramic capacitor according to an embodiment will be described with reference to FIGS. 1 to 3.

Figure 2:
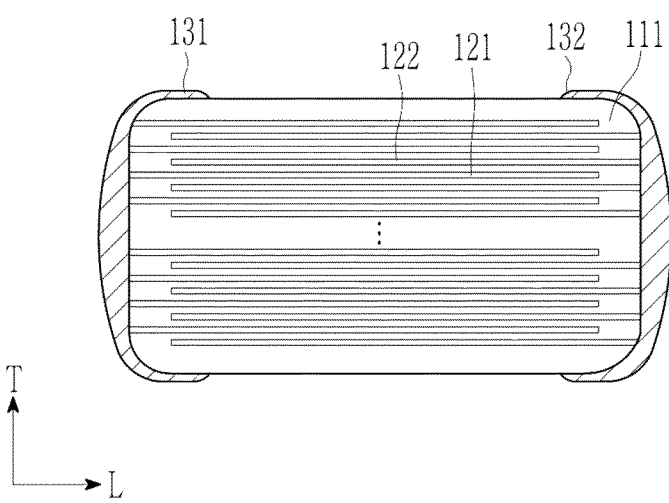
FIG. 2 is a cross-sectional view of the multilayer ceramic capacitor cut along a line I-I' of FIG. 1.
Figure 3:
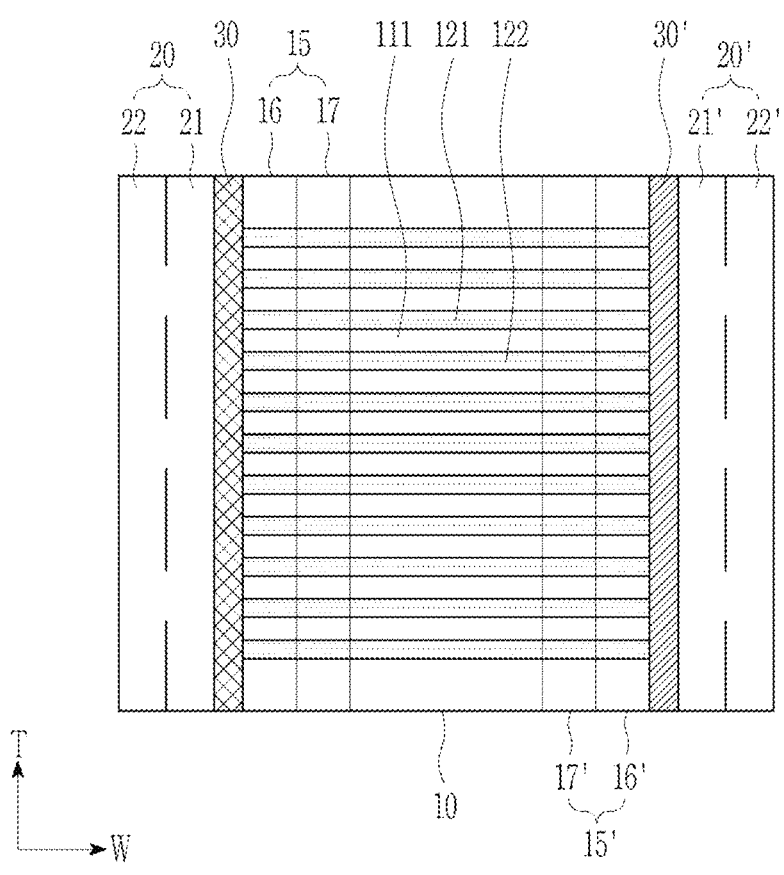
FIG. 3 is a cross-sectional view of the multilayer ceramic capacitor cut along a line II-II' of FIG. 1.

FIG. 1 is a perspective view showing a multilayer ceramic capacitor according to an embodiment, FIG. 2 is a cross-sectional view of the multilayer ceramic capacitor cut along a line I-I' of FIG. 1, and FIG. 3 is a cross-sectional view of the multilayer ceramic capacitor cut along a line II-II' of FIG. 1.

An L-axis, a W-axis, and a T-axis shown in FIGS. 1 to 3 represent a length direction, a width direction, and a thickness direction of a capacitor body 110, respectively. Here, the thickness direction (a T-axis direction) may be a direction perpendicular to a wide surface (a main surface) of a constituent element having a sheet shape. For example, the thickness direction (the T-axis direction) may be used as the same concept as a stacking direction in which dielectric layers 111 is stacked. The length direction (an L-axis direction) may be a direction that extends parallel to the wide surface (the main surface) of the constituent element having the sheet shape, and may be a direction approximately perpendicular to the thickness direction (the T-axis direction). For example, the length direction (the L-axis direction) may be a direction in which a first external electrode 131 and a second external electrode 132 are disposed at both surfaces. The width direction (a W-axis direction) is a direction that extends parallel to the wide surface (the main surface) of the constituent element having the sheet shape, and may be a direction approximately perpendicular to the thickness direction (the T-axis direction) and the length direction (the L-axis direction), and a length of the constituent element having the sheet shape in the length direction (the L-axis direction) may be greater than a length of the constituent element having the sheet shape in the width direction (the W-axis direction).

Referring to FIGS. 1 to 3, the multilayer ceramic capacitor 100 according to some embodiments of the disclosure includes the capacitor body 110, and the external electrodes 131 and 132 disposed outside the capacitor body 110. The external electrodes 131 and 132 may include the first external electrode 131 and the second external electrode 132 disposed at both ends of the capacitor body 110 facing each other in the length direction (the L-axis direction).

For example, the capacitor body 110 may have an approximate hexahedral shape.

For convenience of description of the embodiment, both surfaces of the capacitor body 110 facing each other in the thickness direction (the T-axis direction) are defined as a first surface and a second surface, both surfaces connected to the first surface and the second surface and facing each other in the length direction (the L-axis direction) are defined as a third surface and a fourth surface, and both surfaces connected to the first and second surfaces and the third and fourth surfaces and facing each other in the width direction (the W-axis direction) are defined as a fifth surface and a sixth surface.

For example, the first surface that is a lower surface may be a surface facing a mounting direction. Additionally, the first to sixth surfaces may be flat, but the present disclosure is not limited thereto. For example, each of the first to sixth surfaces may be a curved surface having a convex central portion, and a corner that is a boundary of the surfaces may be rounded.

A shape and a dimension of the capacitor body 110 and the number of the stacked dielectric layers 111 are not limited to those shown in the drawings of the present disclosure.

The capacitor body 110 includes the plurality of dielectric layers 111 and internal electrode layers 121 and 122. Specifically, the capacitor body 110 includes the plurality of dielectric layers 111 and the first internal electrode 121 and the second internal electrode 122 alternately disposed in the thickness direction (the T-axis direction) with the dielectric layer 111 interposed therebetween.

In this case, a boundary between the dielectric layers 111 of the capacitor body 110 adjacent to each other may be integrated to an extent that it is difficult to check the boundary without using a scanning electron microscope (SEM).

The capacitor body 110 includes an active portion 10 in which the dielectric layer and the internal electrode layer are alternately disposed, side margin portions 20 and 20' disposed at both side end portions of the active portion 10 facing each other, and bonding portions 30 and 30' disposed between the active portion 10 and the side margin portions 20 and 20', respectively.

The active portion 10 is a portion that contributes to forming capacitance of the multilayer ceramic capacitor 100. For example, the active portion 10 may be a region where the first internal electrode 121 or the second internal electrode 122 stacked along the thickness direction (the T-axis direction) overlaps.

The side margin portions 20 and 20' may be disposed at both side end portions of the active portion 10 facing each other, may be referred to as side surface cover portions, and may be respectively disposed at both side end portions (that is, the fifth surface and the sixth surface) of the active portion 10 facing each other in the width direction (the W-axis direction).

The capacitor body 110 may further include a cover portion.

The cover portion may be a margin portion in the thickness direction, and may be respectively disposed on the first and second surfaces of the active portion 10 in the thickness direction (the T-axis direction). The cover portion may be a single dielectric layer 111 or two or more dielectric layers 111 stacked on upper and lower surfaces of the active portion 10.

The side margin portions 20 and 20' and the cover portion may serve to prevent damage to the first internal electrode 121 and the second internal electrode 122 due to physical or chemical stress.

The bonding portions 30 and 30' may be disposed between the active portion 10 and the side margin portions 20 and 20', respectively, to serve to bond the side margin portions 20 and 20' to the active portion 10.

At least one of the active portion 10 or at least one of the side margin portions 20 and or 20' may include a barium titanate-based main ingredient including barium (Ba) and titanium (Ti), and gallium (Ga).

The barium titanate-based main ingredient maybe a dielectric base material, may have a high dielectric constant, and may contribute to formation of a dielectric constant of the multilayer ceramic capacitor 100.

For example, the barium titanate-based main ingredient may include $BaTiO_3$, $Ba(Ti,Zr)O_3$, $Ba(Ti,Sn)O_3$, $(Ba,Ca)TiO_3$, $(Ba,Ca)(Ti,Zr)O_3$, $(Ba,Ca)(Ti,Sn)O_3$, $(Ba,Sr)TiO_3$, $(Ba,Sr)(Ti,Zr)O_3$, $(Ba,Sr)(Ti,Sn)O_3$, or a combination thereof.

Gallium (Ga) included in at least one of the active portion 10 or the side margin portions 20 and 20' may be derived from a gallium (Ga) ingredient added when the bonding portions 30 and 30' are formed. That is, in a process of fabricating the capacitor body 110, gallium (Ga) may be an ingredient included in a coating composition for bonding a margin sheet forming the side margin portion and a dielectric green sheet laminate forming the active portion. Gallium (Ga) may diffuse into at least one of the active portion 10 and the side margin portions 20 and 20' after the dielectric green sheet laminate bonded to the margin sheet is fired.

If at least one of the active portion 10 or at least one of the side margin portions 20 and 20' includes a gallium (Ga) ingredient diffusing from an ingredient used for forming the bonding portions 30 and 30', a density of an end of the internal electrode layer may be improved so that moisture resistance reliability and a withstand voltage characteristic of the multilayer ceramic capacitor are improved.

Unlike an active region, a side margin region of a typical multilayer ceramic capacitor may not have an internal electrode so that a step difference occurs as much as a space that is not printed. The phenomenon of occurrence of the step difference may cause various problems such as occurrence of a crack due to external stress, degradation of an electrical characteristic, and the like. According to some embodiments, the multilayer ceramic capacitor can be manufactured by applying a margin formation (MF) method. Specifically, the dielectric green sheet laminate is cut in a state in which the conductive paste layer is exposed without leaving a region where the conductive paste layer is not applied that is a margin region, and then side margin portion is formed by bonding a margin sheet to the cut surface of the dielectric green sheet laminate. In the MF method, if gallium (Ga) is included in a coating composition that serves as a kind of adhesive when the margin sheet is attached to the cut surface, at least one of the active portion 10 and the side margin portions 20 and 20' may include gallium (Ga) as gallium (Ga) diffuses after the margin sheet attached to the cut surface is fired. Thus, adhesion of a bonding surface may be excellent so that occurrence of a delamination defect is suppressed, and moisture resistance reliability may be improved by sufficiently ensuring a density of the bonding surface after the firing.

Specifically, a barium titanate-based main ingredient and gallium (Ga) may be included in at least one of the side margin portions 20 and 20' or may be included in the active portion 10. Additionally, a barium titanate-based main ingredient and gallium (Ga) may be included in both at least one of the side margin portions 20 and 20' and the active portion 10. This may be confirmed by scanning electron microscope (SEM)-energy dispersion spectroscopy (EDS) analysis.

The SEM-EDS analysis may be performed by the following method. First, a cross-section sample in which a surface in the W-axis and T-axis directions (a WT surface) of the capacitor body 110 is polished to a ½ point in the L-axis direction after the multilayer ceramic capacitor 100 is put into an epoxy mixed liquid (or an epoxy mixture) and the put multilayer ceramic capacitor 100 is cured and the polished capacitor body is maintained within a vacuum atmosphere chamber so that the active portion where the dielectric layer 111 and each of the internal electrode layers 121 and 122 cross each other and the side margin portion are observed, may be obtained. Next, the cross-section sample having the WT surface may be divided in half in the width direction (the W-axis direction) so that the side margin portion of one side and the active portion are measured using a scanning electron microscope (SEM). For example, the SEM may be the Verios G4 product from Thermo fisher Scientific Inc., the measurement condition may be 10 kV and 0.2 nA, an analysis magnification may be 10 k times, and at least 10 or more layers of the dielectric layer 111 and the internal electrode layers 121 and 122 may be measured. Subsequently, EDS analysis may be performed on the SEM image of the measured cross-section sample so that it is possible to check whether gallium (Ga) is present in at least one of the active portion or the side margin portion.

According to some embodiments, a barium titanate-based main ingredient and gallium (Ga) may be included in the side margin portions 20 and 20'. At least one of the side margin portions 20 and 20' may include the barium titanate-based main ingredient and gallium (Ga).

In addition, each of the side margin portions 20 and 20' may be substantially equally divided into two in the width direction, and regions closer to the bonding portions 30 and 30' are referred to as first side margin portions 21 and 21', respectively, and the remaining regions are referred to as second side margin portions 22 and 22', respectively. In this case, gallium (Ga) may be included in at least one of the first side margin portions 21 or 21'.

Specifically, gallium (Ga) may be included in an amount ranging from more than 0 parts by weight to 1.5 parts by weight or less with respect to 100 parts by weight of barium (Ba) in the at least one of the first side margin portions 21 or 21'. For example, gallium (Ga) may be included in the at least one of the first side margin portions 21 or 21' in an amount of 0.1 parts by weight to 1.3 parts by weight or 0.3 parts by weight to 1.2 parts by weight with respect to 100 parts by weight of (Ba) in the at least one of the first side margin portions 21 or 21'. If gallium (Ga) is included within the content range in the first side margin portions 21 and 21', the density of the end of the internal electrode layer may be improved so that the moisture resistance reliability and the withstand voltage characteristic of the multilayer ceramic capacitor are improved.

The content of gallium (Ga) in the side margin portion 20 or 20' may be confirmed by the SEM-EDS analysis. Specifically, if the side margin portions are divided into two in the width direction in the SEM image of the cross-section sample obtained by the method described above so that the regions closer to the bonding portions are referred to as the first side margin portions and the remaining regions are referred to as the second side margin portions, the content of gallium (Ga) may be measured at least one point (for example, 1 to 10 points or 1 to 5 points) in each of the first side margin portions and the second side margin portions so that an average value of the measured values is obtained.

Additionally, gallium (Ga) may be included in at least one of the first side margin portions 21 or 21' and at least one of the second side margin portions 22 or 22'. In this case, gallium (Ga) may be included in a higher content in the first side margin portions 21 and 21' than in the second side margin portions 22 and 22'. If gallium (Ga) is included in a higher content in the first side margin portions 21 and 21' closer to the active portion 10 as compared to the second side margin portions 22 and 22', respectively, the density of the end of the internal electrode layer may be improved so that the moisture resistance reliability and the withstand voltage characteristic of the multilayer ceramic capacitor are improved.

In some embodiments, a barium titanate-based main ingredient and gallium (Ga) may be included in the active portion 10.

The active portion 10 may include boundary vicinity regions 15 and 15' defined as a region from a boundary between the active portion 10 and each of the bonding portions 30 and 30' to a point having a length corresponding to two to three times a width direction length of each of the side margin portions 20 and 20', respectively. Specifically, gallium (Ga) may be included in at least one of the boundary vicinity regions 15 or 15' of the active portion 10.

Each of the boundary vicinity regions 15 and 15' of the active portion 10 may be substantially equally divided into two in the width direction, and regions closer to the bonding portions 30 and 30' are referred to as first active portions 16 and 16' and the remaining regions are referred to as second active portions 17 and 17', respectively. In this case, gallium (Ga) may be included in the first active portions 16 and 16' and the second active portions 17 and 17'.

Specifically, gallium (Ga) may be included in a higher content in the first active portions 16 and 16' than in the second active portions 17 and 17', respectively. If gallium (Ga) is included in a higher content within the first active portions 16 and 16' closer to the first side margin portions 21 and 21' among the boundary vicinity regions 15 and 15' of the active portion 10, the density of the end of the internal electrode layer may be improved so that the moisture resistance reliability and the withstand voltage characteristic of the multilayer ceramic capacitor are improved.

The content of gallium (Ga) in the active portion 10 may be confirmed by the SEM-EDS analysis. Specifically, if the active portion includes each of boundary vicinity regions defined as the region from the boundary between the active portion and each of the bonding portions to the point having the length corresponding to two to three times the width direction length of each of the side margin portions in the SEM image of the cross-section sample obtained by the method described above and the boundary vicinity regions of the active portion are divided into two in the width direction so that the regions closer to the bonding portions 30 and 30' are referred to as the first active portions 16 and 16' and the remaining regions are referred to as the second active portions 17 and 17', the content of gallium (Ga) may be measured at least one point (for example, 1 to 10 points or 1 to 5 points) in each of the first active portion and the second active portion so that an average value of the measured values is obtained.

In some embodiments, a barium titanate-based main ingredient and gallium (Ga) may be included in both at least one of the side margin portions 20 and 20' and the active portion 10.

Specifically, gallium (Ga) may be included in a higher content in the side margin portions 20 and 20' than in the active portion 10. If gallium (Ga) is included in a higher content in the side margin portions 20 and 20', the multilayer ceramic capacitor may have the excellent moisture resistance reliability and the excellent withstand voltage characteristic by improving the density of the end of the internal electrode layer.

For example, gallium (Ga) may be included in a higher content in at least one of the first side margin portions 21 or 21' than in at least one of the second side margin portions 22 or 22', respectively, gallium (Ga) may be included in a lower content in the first active portions 16 and 16' than in the second side margin portions 22 and 22', and gallium (Ga) may be included in the lower content in the second active portions 17 and 17' than the first active portions 16 and 16'.

According to an embodiment, at least one of the bonding portions 30 or 30' may include a barium titanate-based compound including barium (Ba) and titanium (Ti), and gallium (Ga).

For example, the barium titanate-based compound may include $BaTiO_3$, $Ba(Ti,Zr)O_3$, $Ba(Ti,Sn)O_3$, $(Ba,Ca)TiO_3$, $(Ba,Ca)(Ti,Zr)O_3$, $(Ba,Ca)(Ti,Sn)O_3$, $(Ba,Sr)TiO_3$, $(Ba,Sr)(Ti,Zr)O_3$, $(Ba,Sr)(Ti,Sn)O_3$, or combinations thereof.

Gallium (Ga) included in the bonding portions 30 and 30' may be derived from the gallium (Ga) ingredient added for forming the bonding portions 30 and 30'.

For example, gallium (Ga) in the 30 and 30' may be in an amount of 0.3 parts by weight to 1.5 parts by weight or 0.5 parts by weight to 1.2 parts by weight based on 100 parts by weight of barium (Ba) in the boding portions 30 and 30'. If gallium (Ga) is included in the content range within the bonding portions 30 and 30', the multilayer ceramic capacitor may have the excellent moisture resistance reliability and the excellent withstand voltage characteristic by improving the density of the end of the internal electrode layer.

The content of gallium (Ga) in the bonding portions 30 and 30' may be confirmed by the SEM-EDS analysis. Specifically, in the SEM image of the cross-section sample obtained by the method described above, the content of gallium (Ga) may be measured at least one point (for example, 1 to 10 points or 1 to 5 points) in the bonding portion so that an average value of the measured values is obtained.

The bonding portions 30 and 30' may be formed with the coating composition used for bonding the margin sheet forming the side margin portion and the dielectric green sheet laminate forming the active portion. A detailed description of the coating composition will be provided later in a description of a method of fabricating the multilayer ceramic capacitor.

According to some embodiments, for example, a pore generation rate at an end portion of each of the internal electrode layers 121 and 122 with respect to a bonding surface between the active portion 10 and each of the bonding portions 30 and 30' may be more than 0% to 40% or less or 1% to 35%. A fact that the pore generation rate at the end portion of the internal electrode layer is within the range may mean that the density of the end of the internal electrode layer at a bonding portion where the side margin portion is bonded is excellent. Thus, the moisture resistance reliability and the withstand voltage characteristic may be improved.

The pore generation rate at the end portion of the internal electrode layer may be measured by the following method. A cross-section sample in which a surface in the W-axis and T-axis directions (a WT surface) of the capacitor body 110 is polished to a ½ point in the L-axis direction after the multilayer ceramic capacitor 100 is put into an epoxy mixed liquid (or an epoxy mixture) and the put multilayer ceramic capacitor 100 is cured and the polished capacitor body is maintained within a vacuum atmosphere chamber so that the active portion where the dielectric layer 111 and each of the internal electrode layers 121 and 122 cross each other and the side margin portion are observed, may be obtained. Next, the cross-section sample having the WT surface may be divided in half in the width direction (the W-axis direction) so that the side margin portion and the active portion of one side are measured using the scanning electron microscope (SEM). Thus, the end portion of the internal electrode layer may be clearly seen. For example, the SEM may be the Verios G4 product from Thermo fisher Scientific Inc., the measurement condition may be 2 kV and 0.2 nA, an analysis magnification may be 10 k times, and at least 10 or more layers (for example, 20 layers to 100 layers or 20 layers to 50 layers) of the dielectric layer 111 and the internal electrode layers 121 and 122 may be measured.

Accordingly, the measured pore generation rate at the end portion of the internal electrode layer may be calculated by Equation 1 below.

$$\text{Pore generation rate at end portion of internal electrode layer (\%)} = (\text{Number of internal electrode layers having pores at end portion thereof/Total number of internal electrode layers}) \times 100 \qquad \text{[Equation 1]}$$

For example, an average thickness (an average length in the T-axis direction) of the dielectric layer 111 may be about 2.0 μm to about 8.0 μm or about 2.4 μm to about 7.8 μm. If the average thickness of the dielectric layer 111 is within the range, the reliability of the multilayer ceramic capacitor is excellent.

The average thickness of the dielectric layer 111 may be measured by scanning electron microscope (SEM) analysis by putting the multilayer ceramic capacitor 100 into an epoxy mixed liquid (or an epoxy mixture), curing the put multilayer ceramic capacitor 100, polishing the cured multilayer ceramic capacitor, and then ion milling the polished multilayer ceramic capacitor. For example, the SEM may be the Verios G4 product from Thermo fisher Scientific Inc., the measurement condition may be 10 kV and 0.2 nA, an analysis magnification may be 100 times, and at least 1 or more layers (for example, 3 or more layers, 5 or more layers, or 10 or more layers) of the dielectric layer 111 may be measured. In the scanning electron microscope (SEM) image, a central point of the dielectric layer 111 in the length direction (the L-axis direction) or the width direction (the W-axis direction) may be used as a reference point. The average thickness of the dielectric layer 111 may be an arithmetic average value of thicknesses of the dielectric layer 111 at ten points spaced apart from the reference point. An interval of the ten points may be adjusted according to a scale of the scanning electron microscope (SEM) image. For example, the interval of the ten points may be 1 μm to 100 μm, 1 μm to 50 μm, or 1 μm to 10 μm. In this case, all ten points have to be disposed within the dielectric layer 111. If all ten points are not disposed within the dielectric layer 111, a position of the reference point may be changed, or the interval between the ten points may be adjusted.

The first internal electrode 121 and the second internal electrode 122 may be electrodes with different polarities, the first internal electrode 121 and the second internal electrode 122 may be alternately disposed to face each other along the T-axis direction with the dielectric layer 111 interposed therebetween, and one end of each of the first internal electrode 121 and the second internal electrode 122 may be exposed through each of the third surface and the fourth surface of the capacitor body 110.

The first internal electrode 121 and the second internal electrode 122 may be electrically insulated from each other by the dielectric layer 111 disposed in the middle thereof.

End portions of the first internal electrode 121 and the second internal electrode 122 may be alternately exposed through the third and fourth surfaces of the capacitor body 110, and may be electrically connected to the first external electrode 131 and the second external electrode 132, respectively.

Each of the first internal electrode 121 and the second internal electrode 122 may include a conductive metal, and for example, each of the first internal electrode 121 and the second internal electrode 122 may include a metal such as Ni, Cu, Ag, Pd, Au, or the like, or an alloy thereof (for example, an Ag—Pd alloy).

Additionally, each of the first internal electrode 121 and the second internal electrode 122 may include a dielectric particle having the same composition as that of a ceramic material included in the dielectric layer 111.

Each of the first internal electrode 121 and the second internal electrode 122 may be formed using a conductive paste including the conductive metal. A printing method of the conductive paste may be a screen printing method or a gravure printing method.

An average thickness of each of the first internal electrode 121 and the second internal electrode 122 may be about 0.1 μm to about 2 μm. The average thickness of each of the first internal electrode 121 and the second internal electrode 122 may be measured by scanning electron microscope (SEM) analysis. Here, because the scanning electron microscope (SEM) analysis is the same as a method of measuring the average thickness of the dielectric layer 111 described above, a description thereof is omitted.

The capacitor body 110 may be formed by firing a laminate in which the plurality of dielectric layers 111 and the internal electrode layers 121 and 122 are laminated. A detailed fabricating method of the capacitor body 110 according to an embodiment will be later described.

The first external electrode 131 and the second external electrode 132 may be provided with voltages having different polarities, and may be electrically connected to exposed portions of the first internal electrode 121 and the second internal electrode 122, respectively.

If a predetermined voltage is applied to the first external electrode 131 and the second external electrode 132, a charge is accumulated between the first internal electrode 121 and the second internal electrode 122 that face each other. In this case, capacitance of the multilayer ceramic capacitor 100 is proportional to overlapped area of the first internal electrode 121 and the second internal electrode 122 that overlap each other along the T-axis direction in the active portion.

Each of the first external electrode 131 and the second external electrode 132 may include first and second connection portions respectively disposed on the third and fourth surfaces of the capacitor body 110 to be connected to the first internal electrode 121 and the second internal electrode 122, and first and second band portions disposed at corners where the third and fourth surfaces of the capacitor body 110 meet the first and second surfaces or the fifth and sixth surfaces of the capacitor body 110.

The first and second band portions may extend from the first and second connection portions to portions of the first and second surfaces or the fifth and sixth surfaces of the capacitor body 110, respectively. The first and second band portions may serve to improve an adhesion strength of the first external electrode 131 and the second external electrode 132.

Each of the first external electrode 131 and the second external electrode 132 may include a sintering metal layer in contact with the capacitor body 110, a conductive resin layer disposed to cover the sintering metal layer, and a plating layer disposed to cover the conductive resin layer.

The sintered metal layer may include a conductive metal and a glass.

The conductive metal may include at least one selected from the group consisting of copper (Cu), nickel (Ni), silver (Ag), palladium (Pd), gold (Au), platinum (Pt), tin (Sn), tungsten (W), titanium (Ti), lead (Pb), an alloy thereof, or a combination thereof, and for example, the copper (Cu) may include a copper (Cu) alloy. If the conductive metal includes copper, a metal other than copper may be included in an amount of 5 parts by mole or less with respect to 100 parts by mole of copper.

The glass may include a composition of mixed oxides, and for example, the composition may be one or more selected from the group consisting of silicon oxide, boron oxide, aluminum oxide, transition metal oxide, alkali metal oxide, and alkaline-earth metal oxide. The transition metal may include at least one selected from the group consisting of zinc (Zn), titanium (Ti), copper (Cu), vanadium (V), manganese (Mn), iron (Fe), and nickel (Ni), the alkali metal may be selected from the group consisting of lithium (Li), sodium (Na), and potassium (K), and the alkaline-earth metal may be one or more selected from the group consisting of magnesium (Mg), calcium (Ca), strontium (Sr), and barium (Ba).

In some embodiments, the conductive resin layer may be formed on the sintering metal layer, and for example, may be formed to completely cover the sintering metal layer. In some embodiments, the first external electrode 131 and the second external electrode 132 may not include the sintering metal layer, and in this case, the conductive resin layer may directly contact the capacitor body 110.

The conductive resin layer may extend to the first and second surfaces or the fifth and sixth surfaces of the capacitor body 110, and a length of a region (i.e., the band portion) in which the conductive resin layer extends to the first and second surfaces or the fifth and sixth surfaces of the capacitor body 110 may be greater than a length of a region (i.e., the band portion) in which the sintering metal layer extends to the first and second surfaces or the fifth and sixth surfaces of the capacitor body 110. In other words, the conductive resin layer is formed on the sintered metal layer and may be formed to completely cover the sintered metal layer. In other words, the conductive resin layer may be formed on the sintering metal layer, and may be formed to completely cover the sintering metal layer.

The conductive resin layer includes a resin and a conductive metal.

The resin included in the conductive resin layer is not particularly limited as long as it has a bonding property and an impact absorption property and is mixed with a conductive metal powder to make a paste, and for example, may include a phenolic resin, an acrylic resin, a silicone resin, an epoxy resin, or a polyimide resin.

The conductive metal included in the conductive resin layer serves to be electrically connected to the first internal electrode 121 and the second internal electrode 122 or the sintering metal layer.

The conductive metal included in the conductive resin layer may have a spherical shape, a flake shape, or a combination thereof. In other words, the conductive metal may be made only in the flake shape, may be made only in the spherical shape, or may have a mixture of the flake shape and the spherical shape.

Here, the spherical shape may include a shape that is not a complete spherical shape, and for example, may include a shape in which a length ratio (a long axis/a short axis) of a long axis to a short axis is 1.45 or less. The powder having the flake shape refers to a powder that has a flat and elongated shape, and the flake shape is not particularly limited, but for example, the flake shape may include a shape in which a length ratio (a long axis/a short axis) of a long axis to a short axis is 1.95 or more.

Each of the first external electrode 131 and the second external electrode 132 may further include a plating layer disposed outside the conductive resin layer.

The plating layer may include at least one selected from the group consisting of nickel (Ni), copper (Cu), tin (Sn), palladium (Pd), platinum (Pt), gold (Au), silver (Ag), tungsten (W), titanium (Ti), lead (Pb), and alloys thereof. For example, the plating layer may be a nickel (Ni) plating layer or a tin (Sn) plating layer, may have a shape in which a nickel (Ni) plating layer and a tin (Sn) plating layer are sequentially stacked, and may have a shape in which a tin (Sn) plating layer, a nickel (Ni) plating layer, and a tin (Sn) plating layer are sequentially stacked. Additionally, the plating layer may include a plurality of nickel (Ni) plating layers and/or a plurality of tin (Sn) plating layers.

The plating layer may improve mountability with a substrate, structural reliability, durability against the outside, thermal resistance, or equivalent series resistance (ESR) of the multilayer ceramic capacitor 100.

Hereinafter, a method of fabricating the multilayer ceramic capacitor 100 according to an embodiment will be described.

The multilayer ceramic capacitor 100 according to the embodiment may be fabricated through a step of preparing the margin sheet with an adhesive surface by applying a coating composition including a barium titanate-based compound and gallium (Ga) to at least one surface of the margin sheet, a step of fabricating a dielectric green sheet using a dielectric slurry and forming a conductive paste layer on a surface of the dielectric green sheet, a step of fabricating a dielectric green sheet laminate by laminating the dielectric green sheet on which conductive paste layers are formed, a step of cutting the dielectric green sheet laminate in a state in which the conductive paste layer is exposed without leaving a region in which the conductive paste layer is not formed, a step of bonding the margin sheet having the adhesive surface to a cut surface of the cut dielectric green sheet laminate, a step of fabricating the capacitor body by firing the dielectric green sheet laminate to which the margin sheet is bonded, and a step of forming the external electrode on one surface of the capacitor body.

First, the margin sheet having the adhesive surface is prepared by applying the coating composition to at least one surface of the margin sheet.

The coating composition includes a barium titanate-based compound and gallium (Ga).

The barium titanate-based compound may include barium (Ba) and titanium (Ti), and for example, the barium titanate-based compound may include $BaTiO_3$, $Ba(Ti,Zr)O_3$, $Ba(Ti,Sn)O_3$, $(Ba,Ca)TiO_3$, $(Ba,Ca)(Ti,Zr)O_3$, $(Ba,Ca)(Ti,Sn)O_3$, $(Ba,Sr)TiO_3$, $(Ba,Sr)(Ti,Zr)O_3$, $(Ba,Sr)(Ti,Sn)O_3$, or a combination thereof.

Gallium (Ga) may be included in an Ga containing oxide, a Ga-containing nitride, a Ga-containing salt compound, or a combination thereof within the coating composition. For example, gallium (Ga) may be an Ga containing oxide for example, gallium oxide ($Ga_2O_3$). Additionally, for example, gallium (Ga) may use a fine particle of 50 nm or less.

Gallium (Ga) may be included in an amount ranging from more than 0 parts by mole to 6 parts by mole or less based on 100 parts by mole of the barium titanate-based compound. For example, gallium (Ga) may be included in an amount of 0.5 parts by mole to 5 parts by mole or 1 part by mole to 4 parts by mole based on 100 parts by mole of the barium titanate-based compound. If gallium (Ga) is included in the content range within the coating composition, the density of the end of the internal electrode layer may be improved so that the multilayer ceramic capacitor with the excellent moisture resistance reliability and the excellent withstand voltage characteristic is fabricated.

The coating composition may further include a binder to provide adhesion.

For example, the binder may include an acryl resin, a polyvinylbutyl resin, a polyvinylacetal resin, an ethylcellulose resin, or the like.

The binder may be included in an amount of 5 parts by weight to 60 parts by weight based on a total amount of the coating composition. For example, the binder may be included in an amount of 40 parts by weight to 60 parts by weight based on the total amount of the coating composition. If the binder is included within the content range, dispersibility of the coating composition may be excellent and sufficient adhesion may be provided to a bonding surface, so that occurrence of a delamination defect is suppressed and the multilayer ceramic capacitor having the excellent moisture resistance reliability may be obtained by sufficiently ensuring a density of the bonding surface after the firing.

The margin sheet may be formed into the side margin portions 20 and 20' after the firing, and the margin sheet may include a barium titanate-based main ingredient. Because the barium titanate-based main ingredient is the same as the barium titanate-based main ingredient included in at least one of the active portion 10 and the side margin portions 20 and 20', a description thereof is omitted.

In a next step, the dielectric green sheet is fabricated using the dielectric slurry, and the conductive paste layer is formed on the surface of the dielectric green sheet.

The dielectric slurry may be prepared by selectively mixing a barium titanate-based main ingredient powder and an accessory ingredient powder.

Because the barium titanate-based main ingredient powder is the same as the barium titanate-based main ingredient included in at least one of the active portion 10 and the side margin portions 20 and 20', a description thereof is omitted.

For example, the accessory ingredient powder may include at least one selected from the group consisting of manganese (Mn), chromium (Cr), silicon (Si), aluminum (Al), magnesium (Mg), tin (Sn), antimony (Sb), germanium (Ge), gallium (Ga), indium (In), barium (Ba), lanthanum (La), yttrium (Y), actinium (Ac), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), lutetium (Lu), hafnium (Hf), vanadium (V), and combinations thereof, but the present disclosure is not limited thereto. The accessory ingredient powder may be included in an amount of 0.01 parts by mole to 5 parts by mole based on 100 parts by mole of the barium titanate-based main ingredient powder.

The accessory ingredient powder may be used in the form of an oxide or a salt compound including a metal, or may be used in the form of a sol dispersed in an organic solvent.

Additionally, the dielectric slurry may be prepared by additionally mixing an additive (e.g., a dispersant, a binder, a plasticizer, a lubricant, an antistatic agent, or the like) and a solvent.

In some embodiments, mixing of the barium titanate-based main ingredient and the accessory ingredient powder may be performed using a wet ball mill or an agitated mill. When a zirconia ball is used in the wet ball mill, wet mixing may be performed for 8 hours to 48 hours or 10 hours to 24 hours using a plurality of zirconia balls with a diameter of 0.1 mm to 10 mm.

The prepared dielectric slurry is formed into the dielectric layer after the firing.

A method for molding the prepared dielectric slurry into a sheet shape may include a tape molding method such as a doctor blade method, a calendar roll method, or the like. For example, the method for molding the prepared dielectric slurry may use an on-roll molding coater of a head discharge type, and the dielectric green sheet may be obtained by drying the molding body.

To form the conductive paste layer that becomes the internal electrode layer after the firing, the conductive paste may be prepared by mixing a conductive powder made of a conductive metal or an alloy thereof, a binder, and a solvent. Additionally, if necessary, a barium titanate powder may be mixed together as a co-material. The co-material may act to suppress sintering of the conductive powder during the firing process. The conductive paste layer is formed by applying the conductive paste to a surface of the dielectric green sheet in a predetermined pattern using various printing or transfer methods such as screen printing and the like.

The conductive paste layer may be applied only on some regions of the surface of the dielectric green sheet. In some embodiments, no conductive paste layer may be applied on both side surfaces of the surface of the dielectric green sheet when the conductive paste layer is applied on the surface of the dielectric green sheet. The dielectric green sheets prepared above may be stacked.

Next, a plurality of the dielectric green sheets where the internal electrode pattern is formed are laminated so that the dielectric green sheet laminate is fabricated. In this case, the dielectric green sheet and the internal electrode pattern may be laminated so that the dielectric green sheet is disposed on upper and lower surfaces of the dielectric green sheet laminate in the laminating direction. The dielectric green sheet laminate may be formed by being pressed in the stacking direction.

Next, the fabricated dielectric green sheet laminate is cut to a predetermined dimension by dicing or the like. In this case, the dielectric green sheet laminate is cut in a state in which the conductive paste layer is exposed without leaving a region where the conductive paste layer is not applied that is a margin region.

In addition, the dielectric green sheet laminate may be solidified and dried to remove the plasticizer or the like if necessary, and after the dielectric green sheet laminate is solidified and dried, barrel polishing may be performed on the solidified and dried laminate using a horizontal centrifugal barrel machine or the like. In the barrel polishing, the dielectric green sheet laminate may be put into a barrel container together with a media and a polishing liquid and rotation motion or vibration may be applied to the barrel container so that an unnecessary portion such as a burr or the like generated during the cutting is polished. Additionally, after the barrel polishing, the dielectric green sheet laminate may be washed with a cleaning solution such as water or the like, and the washed laminate may be dried.

Next, the margin sheet with the previously prepared adhesive surface is bonded to the cut surface of the dielectric green sheet laminate.

Next, the capacitor body may be fabricated by removing the binder from the dielectric green sheet laminate to which the margin sheet is bonded and firing the dielectric green sheet laminate in which the binder is removed.

Figure 4:
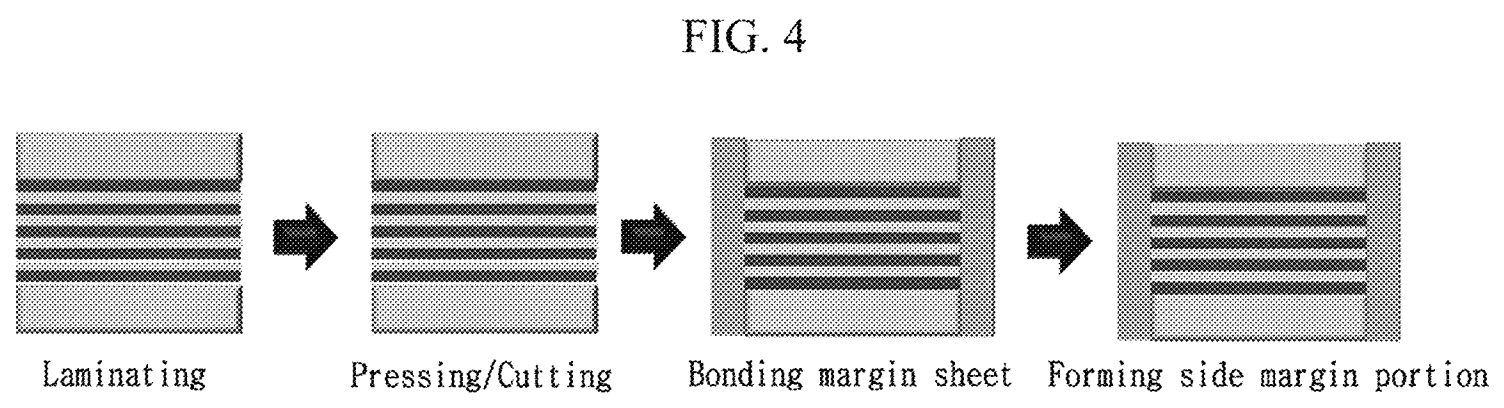

FIG. 4 is a schematic diagram showing a process of forming the side margin portion in a method of fabricating the multilayer ceramic capacitor according to some embodiments.

Referring to FIG. 4, as described above, after the dielectric green sheet laminate is pressed and cut, the margin sheet having the adhesive surface is bonded, and then the side margin portion connected to the active portion is formed by firing the bonded margin sheet.

The binder removal treatment condition may be appropriately adjusted depending on ingredients of the dielectric layer or ingredients of the internal electrode layer. For example, a temperature increase speed during the binder removal treatment may be 5° C./hour to 300° C./hour, a support temperature during the binder removal treatment may be 180° C. to 400° C., and a temperature maintenance time during the binder removal treatment may be 0.5 hours to 24 hours. An atmosphere during the binder removal treatment may be air or a reducing atmosphere.

A condition for the firing treatment may be appropriately adjusted depending on a main ingredient composition of the dielectric layer or a main ingredient composition of the internal electrode. For example, the firing may be performed at a temperature of 1100° C. to 1400° C. or 1200° C. to 1350° C. Additionally, the firing may be performed for 0.5 hours to 8 hours or 1 hour to 3 hours. Additionally, the firing may be performed in a reducing atmosphere (for example, an atmosphere including a humidified mixed gas of nitrogen and hydrogen). If the internal electrode includes nickel (Ni) or a nickel (Ni) alloy, an oxygen partial pressure in the firing atmosphere may be $1.0 \times 10^{-14}$ MPa to $1.0 \times 10^{-10}$ MPa.

After the firing treatment, annealing may be performed if necessary. The annealing may be a treatment for re-oxidizing the dielectric layer, and the annealing may be performed if the firing treatment is performed in the reducing atmosphere. A condition of the annealing treatment may be appropriately adjusted depending on an ingredient of the dielectric layer. For example, a temperature during the annealing may be 950° C. to 1150° C., a time during the annealing may be 0 hours to 20 hours, and a temperature increase speed during the annealing may be 50° C./hour to 500° C./hour. An atmosphere of the annealing may be a humidified nitrogen gas ($N_2$) atmosphere, and an oxygen partial pressure in the atmosphere of the annealing may be $1.0 \times 10^{-9}$ MPa to $1.0 \times 10^{-5}$ MPa.

In the binder removal treatment, the firing treatment, or the annealing treatment, for example, a wetter or the like may be used to humidify the nitrogen gas, the mixed gas, or the like. In this case, a temperature of water may be 5° C. to 75° C. The binder removal treatment, the firing treatment, or the annealing treatment may be sequentially performed or may be independently performed.

In some embodiments, a surface treatment such as a sandblasting treatment, laser irradiation, the barrel polishing, or the like may be performed on the third and fourth surfaces of the fabricated capacitor body 110. By performing the surface treatment, end portions of the first internal electrode and the second internal electrode may be exposed on outermost surfaces of the third and fourth surfaces. Thus, electrical bonding between the first and second external electrodes and the first and second internal electrodes may become good, and the alloy portion may be easily formed.

Next, the external electrode is formed on one surface of the fabricated capacitor body 110.

For example, a paste for forming the sintering metal layer may be applied to the external electrode, and then the applied external electrode may be sintered to form the sintering metal layer.

The paste for forming the sintering metal layer may include a conductive metal and a glass. Descriptions of the conductive metal and the glass are the same as those described above so that repeated descriptions thereof are omitted. Additionally, the paste for forming the sintering metal layer may selectively include a binder, a solvent, a dispersant, a plasticizer, an oxide powder, or the like. For example, the binder may use ethylcellulose, acryl, butyral, or the like, and for example, the solvent may use an organic solvent (e.g., terpineol, butylcarbitol, alcohol, methyl ethyl ketone, acetone, toluene, or the like) or an aqueous solvent.

A method for applying the paste for forming the sintering metal layer to an outer surface of the capacitor body 110 may include various printing methods such as a dip method, screen printing, and the like, an application method using a dispenser or the like, a spraying method using a spray, or the like. The paste for forming the sintering metal layer may be applied to at least the third and fourth surfaces of the capacitor body 110, and may selectively be applied to a portion of the first, second, fifth, or sixth surfaces where the band portion of each of the first and second external electrodes is formed.

Thereafter, the capacitor body 110 on which the paste for forming the sintering metal layer is applied may be dried, and the dried capacitor body may be sintered at a temperature of 700° C. to 1000° C. for 0.1 to 3 hours to form the sintering metal layer.

In some embodiments, a paste for forming the conductive resin layer may be applied to the outer surface of the capacitor body 110, and then the applied capacitor body may be cured to form the conductive resin layer.

The paste for forming the conductive resin layer may include a resin, and may selectively include a conductive metal or a non-conductive filler. Descriptions of the conductive metal and the resin are the same as those described above so that repeated descriptions thereof are omitted. Additionally, the paste for forming the conductive resin layer may selectively include a binder, a solvent, a dispersant, a plasticizer, an oxide powder, or the like. For example, the binder may include ethylcellulose, acryl, butyral, or the like, and for example, the solvent may be an organic solvent (e.g., terpineol, butylcarbitol, alcohol, methyl ethyl ketone, acetone, toluene, or the like) or an aqueous solvent.

In some embodiments, the conductive resin layer may be formed by dipping the capacitor body 110 into the paste for forming the conductive resin layer and then curing the dipped capacitor body, the conductive resin layer may be formed by printing the paste for forming the conductive resin layer on a surface of the capacitor body 110 using a screen printing method, a gravure printing method, or the like, or the conductive resin layer may be formed by applying the paste for forming the conductive resin layer to the surface of the capacitor body 110 and then curing the applied capacitor body.

Next, the plating layer may be formed at the outside of the conductive resin layer.

For example, the plating layer may be formed by a plating method, or may be formed by sputter or electric deposition.

Hereinafter, the above-described implementation example will be described in more detail through an embodiment below. However, the embodiment below is for illustrative purpose only and does not limit the scope of the present disclosure.

(Fabricating of Multilayer Ceramic Capacitor)

Example 1

The coating composition was prepared by mixing a $BaTiO_3$ powder, a $Ga_2O_3$ powder, and a polyvinyl butyral resin. The $Ga_2O_3$ powder was mixed in an amount of 3 parts by mole based on 100 parts by mole of the $BaTiO_3$ powder, and the binder was mixed in an amount of 50 parts by weight based on a total amount of the coating composition. The prepared coating composition was applied to one surface of the margin sheet including $BaTiO_3$ so that the margin sheet with the adhesive surface was prepared.

The dielectric slurry was prepared by using a zirconia ($ZrO_2$) ball as a dispersion medium using the $BaTiO_3$ powder, adding ethanol (or toluene), a wetting dispersant, and a polyvinyl butyral (PVB) resin that was a binder, and then performing mechanical milling.

Next, the dielectric green sheet was fabricated using the prepared dielectric slurry through the on-roll molding coater of the head discharge type. The conductive paste layer including nickel (Ni) was printed on a surface of the dielectric green sheet, and the dielectric green sheet laminate was fabricated by laminating and pressing the dielectric green sheet (a width×a length×a height=3.2 mm×2.5 mm×2.5 mm) on which the conductive paste layer is formed.

The dielectric green sheet laminate was cut in a state in which the conductive paste layer was exposed without leaving a region where the conductive paste layer was not printed. The margin sheet having the adhesive surface was bonded to a cut surface of the dielectric green sheet laminate.

A plasticization process was performed on the dielectric green sheet laminate to which the margin sheet was bonded at 400° C. or less in a nitrogen atmosphere, and the dielectric green sheet laminate was fired under conditions of a firing temperature of 1300° C. and a hydrogen ($H_2$) concentration of 1.0% or less.

Subsequently, the multilayer ceramic capacitor was fabricated through processes such as forming of the external electrode, the plating, and the like.

Example 2

The multilayer ceramic capacitor was fabricated in the same method as Embodiment 1 except that the $Ga_2O_3$ powder was mixed in an amount of 6 parts by mole based on 100 parts by mole of the $BaTiO_3$ powder when the coating composition was prepared in Example 1.

Comparative Example 1

The multilayer ceramic capacitor was fabricated in the same method as Embodiment 1 except that the $Ga_2O_3$ powder was not used when the coating composition is prepared in Example 1.

Evaluation 1: SEM-EDS Analysis

Figure 5A:
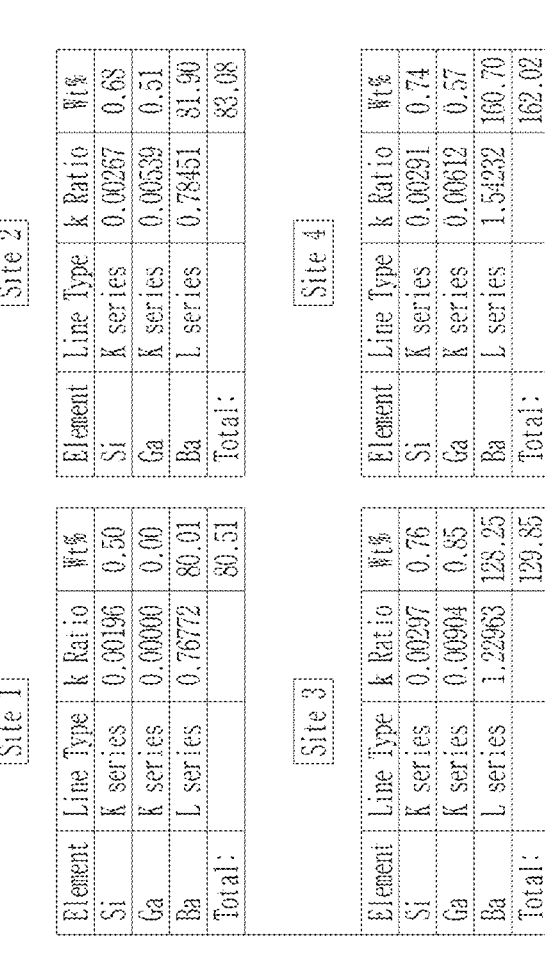
FIG. 5A is a graph showing a content of gallium (Ga) at each position in the multilayer ceramic capacitor according to Example 1.
Figure 5A:
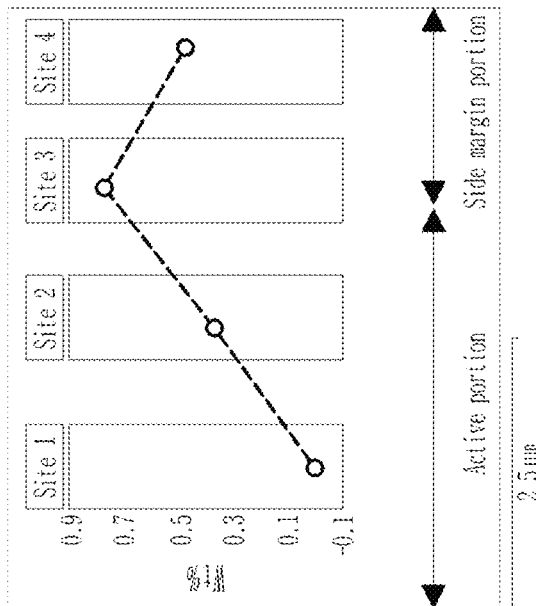
Figure 5B:
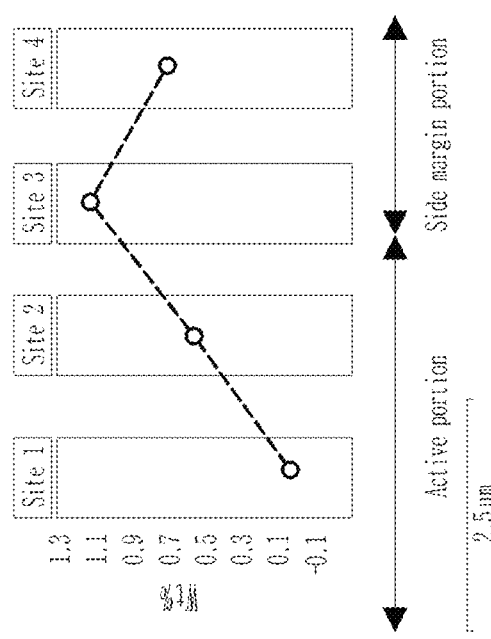
FIG. 5B is a graph showing a content of gallium (Ga) at each position in the multilayer ceramic capacitor according to Example 2.

An analysis of the scanning electron microscope (SEM)-energy dispersion spectroscopy (EDS) was performed on the multilayer ceramic capacitors fabricated in Examples 1 and 2 to confirm a presence and a content of gallium (Ga) at each position, and the result thereof is shown in FIG. 5A and FIG. 5B.

The analysis of the SEM-EDS was measured using the following method.

A cross-section sample in which a surface in the W-axis and T-axis directions (a WT surface) of the capacitor body 110 was polished to a ½ point in the L-axis direction after the multilayer ceramic capacitor 100 fabricated in Examples 1 and 2 was put into an epoxy mixed liquid (or an epoxy mixture) and the put multilayer ceramic capacitor 100 was cured and the polished capacitor body was maintained within a vacuum atmosphere chamber so that the active portion where the dielectric layer 111 and each of the internal electrode layers 121 and 122 crossed each other and the side margin portion were observed, was obtained. Next, the cross-section sample having the WT surface was divided in half in the width direction (the W-axis direction) so that the side margin portion and the active portion of one side were measured using the scanning electron microscope (SEM). For example, the SEM was the Verios G4 product from Thermo fisher Scientific Inc., the measurement condition was 10 kV and 0.2 nA, an analysis magnification was 10 k times, and at least 10 or more layers of the dielectric layer 111 and the internal electrode layers 121 and 122 were measured.

Subsequently, the EDS analysis was performed in the SEM image of the measured cross-section sample. In the SEM image of the measured cross-section sample, the EDS analysis substantially equally divided the side margin portions into two in the width direction so that the regions closer to the bonding portions were referred to as the first side margin portions and the remaining regions were referred to as the second side margin portions. In addition, the active portion included each of boundary vicinity regions defined as the region from the boundary between the active portion and each of the bonding portions to the point having the length corresponding to two to three times the width direction length of each of the side margin portions in the SEM image, and the boundary vicinity regions of the active portion were substantially equally divided into two in the width direction so that the regions closer to the bonding portions were referred to as the first active portions and the remaining regions were referred to as the second active portions. Here, a content of gallium (Ga) was measured at one point of each of the first side margin portion, the second side margin portion, the first active portion, and the second active portion.

FIG. 5A is a graph showing a content of gallium (Ga) at each position in the multilayer ceramic capacitor according to Example 1, and FIG. 5B is a graph showing a content of gallium (Ga) at each position in the multilayer ceramic capacitor according to Example 2.

Referring to FIG. 5A and FIG. 5B, in Examples 1 and 2, it may be seen that at least one of the active portion (Site 1 and Site 2) and the side margin portion (Site 3 and Site 4) included the gallium (Ga). In addition, it may be seen that gallium (Ga) was included in an amount of 0.7 parts by weight based on 100 parts by weight of barium (Ba) in the first side margin portion (Site 3) of Example 1, and gallium (Ga) was included in an amount of 0.8 parts by weight based on 100 parts by weight of barium (Ba) in the first side margin portion (Site 3) of Example 2. In addition, it may be seen that gallium (Ga) was included in a higher content in the first side margin portion (Site 3) than in the second side margin portion (Site 4).

Evaluation 2: SEM Analysis

Figure 6A:
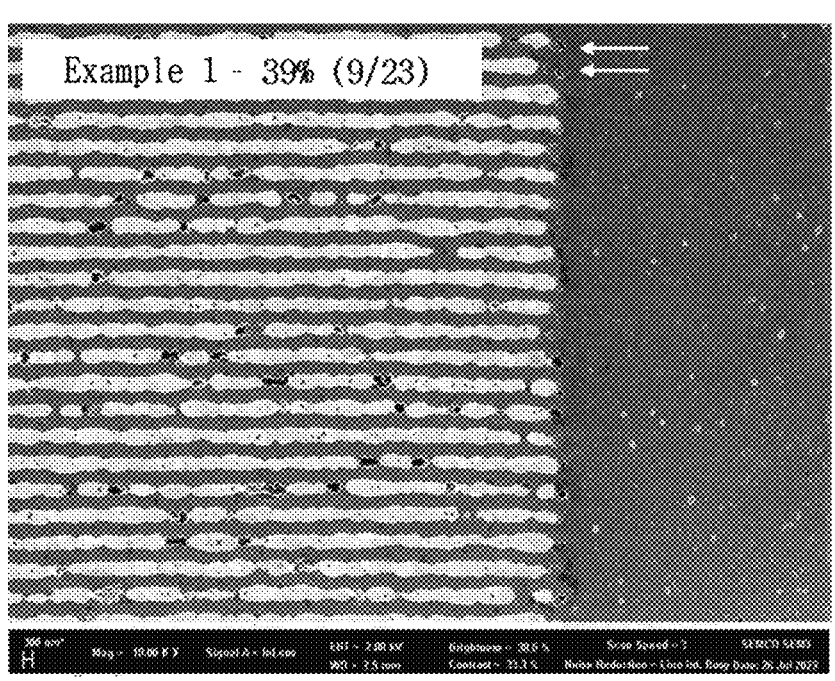
FIG. 6A is a SEM image showing generation of a pore at an end portion of an internal electrode layer in the multilayer ceramic capacitor according to Example 1.
Figure 6B:
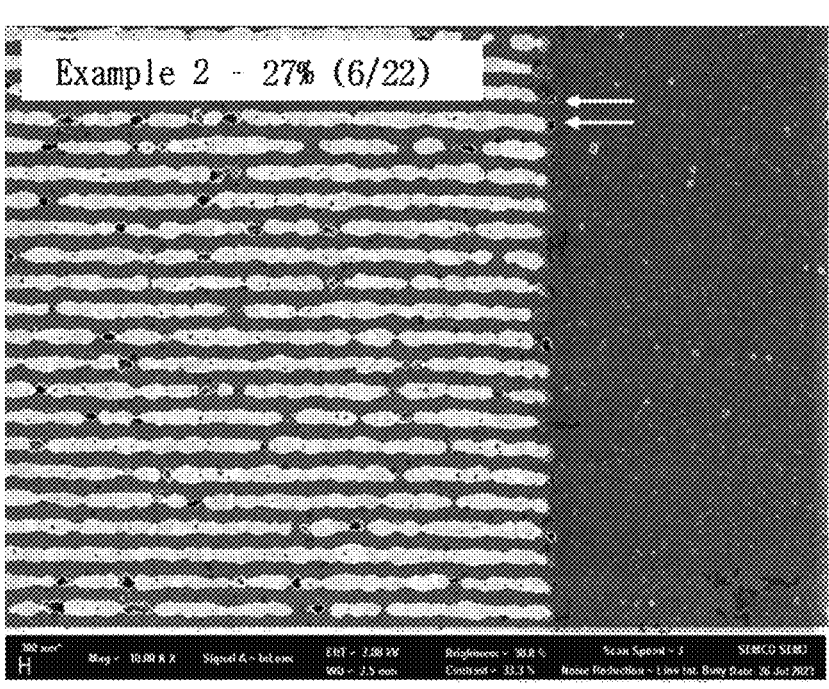
FIG. 6B is a SEM image showing generation of a pore at an end portion of an internal electrode layer in the multilayer ceramic capacitor according to Example 2.
Figure 6C:
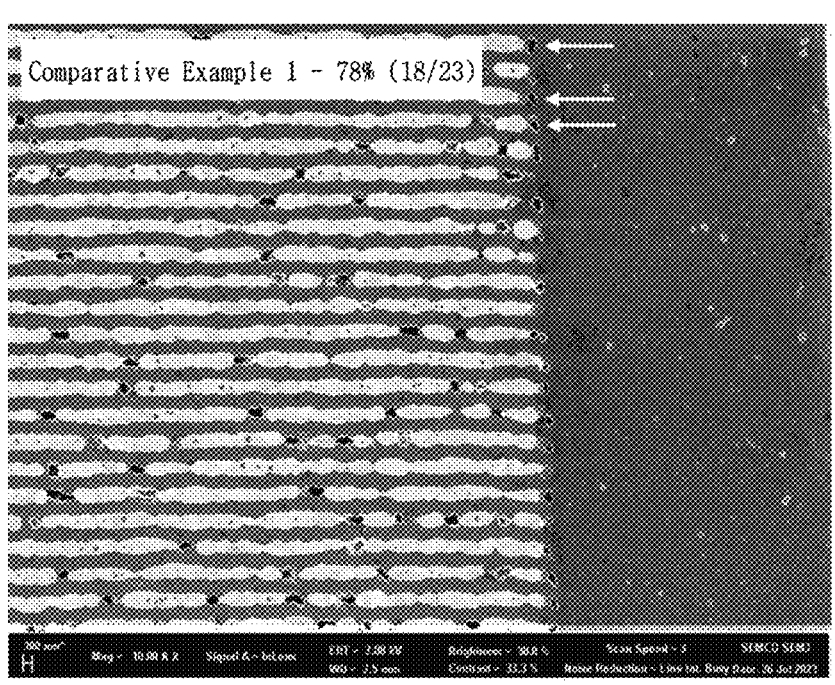
FIG. 6C is a SEM image showing generation of a pore at an end portion of an internal electrode layer in the multilayer ceramic capacitor according to Comparative Example 1.

Scanning electron microscope (SEM) analysis was performed on the multilayer ceramic capacitors fabricated in Examples 1 and 2 and Comparative Example 1 so that the pore generation rate at the end portion of the internal electrode layer was confirmed, and the result thereof is shown in FIGS. 6A to 6C.

First, the SEM analysis was performed as follows. A cross-section sample in which a surface in the W-axis and T-axis directions (a WT surface) of the capacitor body 110 was polished to a ½ point in the L-axis direction after the multilayer ceramic capacitor 100 manufactured in Embodiment 1, Embodiment 2, or Comparative example 1 was put into an epoxy mixed liquid (or an epoxy mixture) and the put multilayer ceramic capacitor 100 was cured and the polished capacitor body was maintained within a vacuum atmosphere A cross-section sample in which a surface in the W-axis and T-axis directions (a WT surface) of the capacitor body 110 was polished to a ½ point in the L-axis direction after the multilayer ceramic capacitor 100 fabricated in Examples 1 and 2, and Comparative Example 1 was put into an epoxy mixed liquid (or an epoxy mixture) and the put multilayer ceramic capacitor 100 was cured and the polished capacitor body was maintained within a vacuum atmosphere chamber so that the active portion where the dielectric layer 111 and each of the internal electrode layers 121 and 122 crossed each other and the side margin portion were observed, was obtained. Next, the cross-section sample having the WT surface were divided in half in the width direction (the W-axis direction) so that the side margin portion and the active portion of one side were measured using the scanning electron microscope (SEM). Thus, the end portion of the internal electrode layer is clearly seen. For example, the SEM was the Verios G4 product from Thermo fisher Scientific Inc., the measurement condition was 2 kV and 0.2 nA, an analysis magnification was 10 k times, and at least 20 or more layers of the dielectric layer 111 and the internal electrode layers 121 and 122 were measured.

The pore generation rate at the end portion of the internal electrode layer in the SEM image of the measured cross-section sample was obtained by Equation 1 below.

$$\text{Pore generation rate at end portion of internal electrode layer (\%)} = (\text{Number of internal electrode layers having pores at end portion thereof/Total number of internal electrode layers}) \times 100 \quad \text{[Equation 1]}$$

FIG. 6A is a SEM image showing generation of the pore at the end portion of the internal electrode layer in the multilayer ceramic capacitor according to Example 1. FIG. 6B is a SEM image showing generation of the pore at the end portion of the internal electrode layer in the multilayer ceramic capacitor according to Example 2. FIG. 6C is a SEM image showing generation of the pore at the end portion of the internal electrode layer in the multilayer ceramic capacitor according to Comparative example 1.

Referring to FIGS. 6A to 6C, it may be seen that the pore generation rate at the end portion of the internal electrode layer of Example 1 was 39% and the pore generation rate at the end portion of the internal electrode layer of Example 2 was 27% but the pore generation rate at the end portion of the internal electrode layer of Comparative Example 1 was 78%. From this, it may be seen that the multilayer ceramic capacitor according to the present embodiment including gallium (Ga) in at least one of the active portion and the side margin portion had excellent density of the end of the internal electrode layer. Accordingly, the moisture resistance reliability and the withstand voltage characteristic may be improved.

Evaluation 3: Moisture Resistance Reliability

Figure 7A:
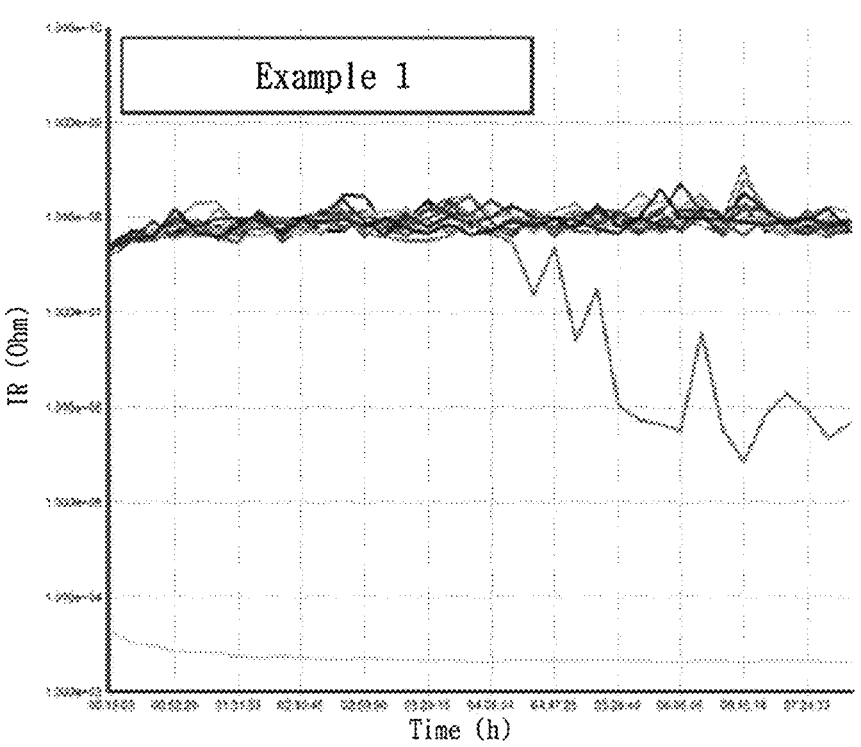
FIG. 7A is a graph showing moisture resistance reliability of the multilayer ceramic capacitor according to Example 1.
Figure 7B:
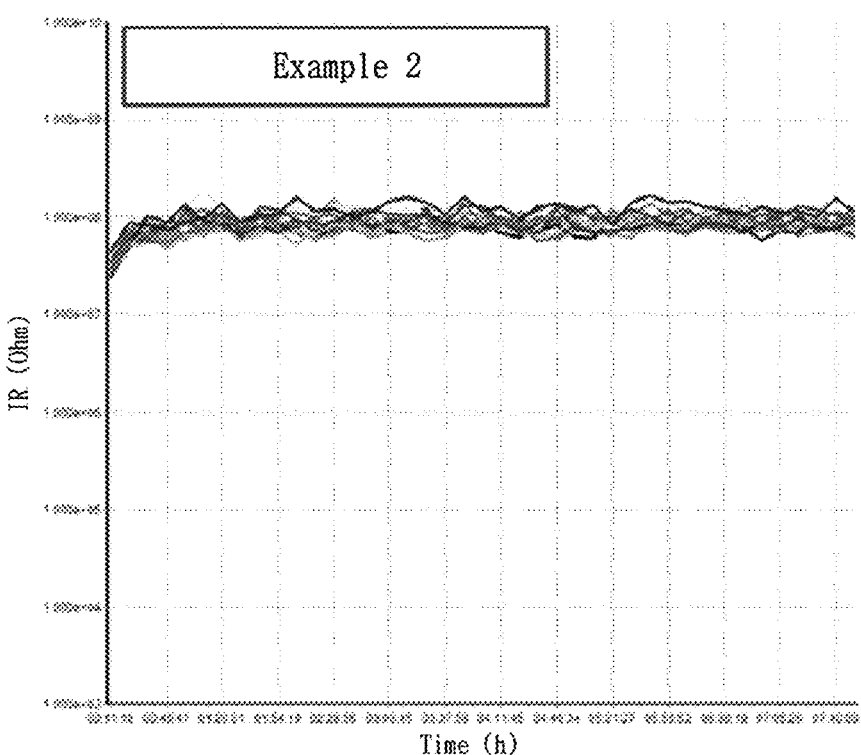
FIG. 7B is a graph showing moisture resistance reliability of the multilayer ceramic capacitor according to Example 2.
Figure 7C:
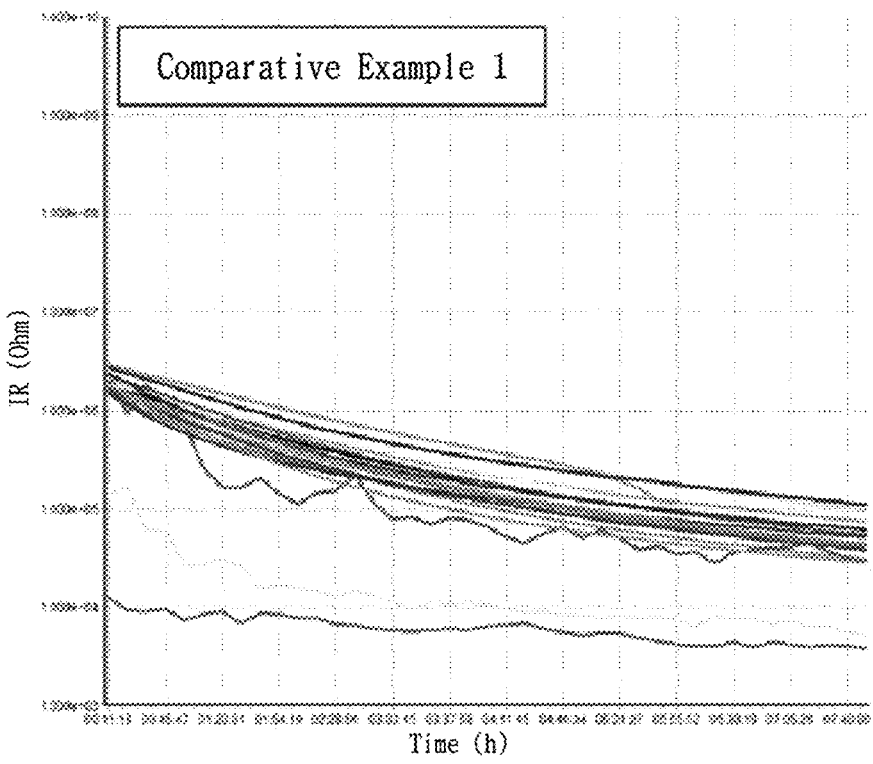
FIG. 7C is a graph showing moisture resistance reliability of the multilayer ceramic capacitor according to Comparative Example 1.

The moisture resistance reliability of the multilayer ceramic capacitor fabricated in Examples 1 and 2, and Comparative Example 1 were measured, and the result thereof is shown in FIGS. 7A to 7C.

Specifically, 80 multilayer ceramic capacitors fabricated in Examples 1 and 2, and Comparative Example 1 were prepared to be mounted on a measurement substrate, and the moisture resistance reliability of the multilayer ceramic capacitor was measured under conditions of 85° C., relative humidity (RH) of 85%, 6.3V, and 8 hours using ESPEC (PR-3J, 8585) equipment.

FIG. 7A is a graph showing the moisture resistance reliability of the multilayer ceramic capacitor according to Example 1. FIG. 7B is a graph showing the moisture resistance reliability of the multilayer ceramic capacitor according to Example 2. FIG. 7C is a graph showing the moisture resistance reliability of the multilayer ceramic capacitor according to Comparative Example 1.

Referring to FIGS. 7A to 7C, it may be seen that Examples 1 and 2 including gallium (Ga) in at least one of the active portion and the side margin portion had superior moisture resistance reliability compared with Comparative Example 1.

While this disclosure has been described in connection with what is presently considered to be practical embodiments, it is to be understood that the disclosure is not limited to the disclosed embodiments, but, on the contrary, is intended to cover various modifications and equivalent arrangements included within the spirit and scope of the appended claims.

DESCRIPTION OF SYMBOLS

100: multilayer ceramic capacitor
110: capacitor body
111: dielectric layer
121: first internal electrode
122: second internal electrode
131: first external electrode
132: second external electrode
10: active portion
15, 15': boundary vicinity region
16, 16': first active portion
17, 17': second active portion
20, 20': side margin portion
21, 21': first side margin portion
22, 22': second side margin portion
30, 30': bonding portion

What is claimed is:

1. A multilayer ceramic capacitor, comprising:
a capacitor body including a dielectric layer and an internal electrode layer; and
an external electrode disposed on an outside surface the capacitor body,
wherein
the capacitor body includes: an active portion where the dielectric layer and the internal electrode layer are alternately disposed; side margin portions disposed at both side end portions of the active portion facing each other; and bonding portions disposed between the active portion and the side margin portions; and
the side margin portions includes a barium titanate-based main ingredient including barium (Ba) and titanium (Ti), and gallium (Ga),
each of the side margin portions are divided into a first side margin portion and a second side margin portion in a width direction,
the first side margin portion is a region closer to the bonding portions;
the second side margin portion is a remaining region,
the first side margin portion includes gallium (Ga),
wherein gallium (Ga) is included in the first side margin portion and the second side margin portion, and gallium (Ga) is included in a higher content in the first side margin portion than in the second side margin portion.

2. The multilayer ceramic capacitor of claim 1, wherein the first side margin portion includes gallium (Ga) in an amount ranging from more than 0 parts by weight to 1.5 parts by weight or less based on 100 parts by weight of barium (Ba) included in the first side margin portion.

3. The multilayer ceramic capacitor of claim 1, wherein the active portion includes the barium titanate-based main ingredient and gallium (Ga).

4. The multilayer ceramic capacitor of claim 3, wherein the active portion includes boundary vicinity regions defined as a region from a boundary between the active portion and each of the bonding portions to a point having a length corresponding to two to three times a width direction length of each of the side margin portions, and gallium (Ga) is included in the boundary vicinity region of the active portion.

5. The multilayer ceramic capacitor of claim 4, wherein the boundary vicinity regions of the active portion are divided into a first active portion and a second active portion in a width direction, the first active portion is a region closer to one of the bonding portions, and the second active portion is a remaining region a, gallium (Ga) is included in the first active portion and the second active portion, and gallium (Ga) is included in a higher content in the first active portion than in the second active portion.

6. The multilayer ceramic capacitor of claim 1, wherein each of the side margin portion and the active portion includes the barium titanate-based main ingredient and gallium (Ga).

7. The multilayer ceramic capacitor of claim 6, wherein gallium (Ga) is included in a higher content in the side margin portion than in the active portion.

8. The multilayer ceramic capacitor of claim 1, wherein the bonding portion includes a barium titanate-based compound including barium (Ba) and titanium (Ti), and gallium (Ga).

9. The multilayer ceramic capacitor of claim 8, wherein the bonding portion includes gallium (Ga) in an amount of 0.3 parts by weight to 1.5 parts by weight based on 100 parts by weight of the barium (Ba).

10. The multilayer ceramic capacitor of claim 1, wherein a pore generation rate at an end portion of the internal electrode layer obtained by Equation 1 below with respect to a bonding surface between the active portion and the bonding portion is more than 0% to 40% or less:

The pore generation rate at the end portion of the internal electrode layer (%)=(The number of internal electrode layers having pores at the end portion thereof/Total number of the internal electrode layers)×100.  [Equation 1]

11. The multilayer ceramic capacitor of claim 1, wherein at least one of the bonding portions includes gallium (Ga) in an amount of 0.5 parts by weight to 1.2 parts by weight based on 100 parts by weight of barium (Ba) in the bonding portions.

12. A multilayer ceramic capacitor, comprising:

a capacitor body including a dielectric layer and an internal electrode layer; and an external electrode disposed on an outside surface the capacitor body, wherein the capacitor body includes: an active portion where the dielectric layer and the internal electrode layer are alternately disposed; side margin portions disposed at both side end portions of the active portion facing each other; and bonding portions disposed between the active portion and the side margin portions; and at least one of the bonding portions includes gallium (Ga) in an amount of 0.3 parts by weight to 1.5 parts based on 100 parts by weight of barium (Ba) in the bonding portions, each of the side margin portions are divided into a first side margin portion and a second side margin portion in a width direction, the first side margin portion is a region closer to the bonding portions;

the second side margin portion is a remaining region, the first side margin portion includes gallium (Ga), wherein gallium (Ga) is included in the first side margin portion and the second side margin portion, and gallium (Ga) is included in a higher content in the first side margin portion than in the second side margin portion.

\* \* \* \* \*